(12) United States Patent
Chang

(10) Patent No.: US 11,503,915 B1
(45) Date of Patent: Nov. 22, 2022

(54) CHAIR SEAT CAPABLE OF ADJUSTING WIDTH

(71) Applicant: Chin-Chia Chang, Kaohsiung (TW)

(72) Inventor: Chin-Chia Chang, Kaohsiung (TW)

( * ) Notice: Subject to any disclaimer, the term of this patent is extended or adjusted under 35 U.S.C. 154(b) by 0 days.

(21) Appl. No.: 17/356,625

(22) Filed: Jun. 24, 2021

(51) Int. Cl.
| | |
|---|---|
| *A47C 3/00* | (2006.01) |
| *A47C 7/02* | (2006.01) |
| *A47C 7/14* | (2006.01) |
| *B62J 1/00* | (2006.01) |
| *B62J 1/02* | (2006.01) |
| *B62J 1/08* | (2006.01) |

(52) U.S. Cl.
CPC .................. *A47C 7/14* (2013.01); *A47C 3/00* (2013.01); *A47C 7/024* (2013.01); *B62J 1/005* (2013.01)

(58) Field of Classification Search
CPC ... A47C 3/00; A47C 7/024; A47C 7/14; B62J 1/005
USPC .................................................. 297/201, 312
See application file for complete search history.

(56) References Cited

U.S. PATENT DOCUMENTS

| | | | | |
|---|---|---|---|---|
| 608,682 A | * | 8/1898 | Jamieson ................. | B62J 1/005 297/201 |
| 619,204 A | * | 2/1899 | Moore ..................... | B62J 1/005 297/201 |
| 622,357 A | * | 4/1899 | Hitchcock et al. ...... | B62J 1/005 297/201 X |
| 629,956 A | * | 8/1899 | Craig ....................... | B62J 1/005 297/201 |
| 635,598 A | * | 10/1899 | Rowe ....................... | B62J 1/005 297/201 X |
| 712,059 A | * | 10/1902 | Goerke ................... | A47C 7/024 297/312 |
| 4,877,286 A | * | 10/1989 | Hobson .................... | B62J 1/002 297/201 X |
| 5,352,016 A | * | 10/1994 | Hobson ...................... | B62J 1/10 297/201 |
| 5,713,632 A | * | 2/1998 | Su .......................... | A47C 7/024 297/312 X |
| 6,290,291 B1 | * | 9/2001 | Kojima ..................... | B62J 1/10 297/201 X |

(Continued)

FOREIGN PATENT DOCUMENTS

| | | | | |
|---|---|---|---|---|
| AT | 522122 A1 | * | 8/2020 | ............. A47C 7/024 |
| WO | WO-2012010282 A1 | * | 1/2012 | ............. A47C 7/024 |
| WO | WO-2020089528 A1 | * | 5/2020 | ............... A47C 3/18 |

*Primary Examiner* — Rodney B White
(74) *Attorney, Agent, or Firm* — Karin L. Williams; Alan D. Kamrath; Mayer & Williams PC

(57) ABSTRACT

A chair seat capable of adjusting a width contains a base, an adjustment assembly, a first sitting portion, a second sitting portion, an adjustable clamp portion, a first guide member, a second guide member, a central shaft, and a screw bolt. The base includes a threaded orifice, multiple locking orifices, a support portion, and a groove. The adjustment assembly includes a first wing and a second wing. The first sitting portion includes a first tilted supporting face. The second sitting portion includes a second tilted supporting face. The adjustable clamp portion includes a guiding orifice. The first guide member includes a first oblique press face and a first connection orifice. The second guide member includes a second oblique press face and a second connection orifice. The central shaft includes an abutting face, multiple fixing orifices, and multiple screws inserting. The screw bolt includes a rotary knob and a non-threaded section.

3 Claims, 6 Drawing Sheets

(56) References Cited

U.S. PATENT DOCUMENTS

| | | | |
|---|---|---|---|
| 7,976,102 B2 * | 7/2011 | Chang | A47C 9/002 297/201 |
| 2005/0173951 A1 * | 8/2005 | Jalkanen | A47C 7/029 297/201 |
| 2019/0069679 A1 * | 3/2019 | Petty | B62J 1/007 |
| 2019/0082848 A1 * | 3/2019 | McClintock | A47C 7/506 |
| 2020/0187659 A1 * | 6/2020 | Chang | A47C 7/024 |

* cited by examiner

CHAIR SEAT CAPABLE OF ADJUSTING WIDTH

BACKGROUND OF THE INVENTION

Field of the Invention

The present invention relates to a chair seat capable of adjusting a width which contains a first sitting portion and a second sitting portion which are adjustably turned on/off to obtain a desired width based on different sizes of buttocks.

Description of the Prior Art

At present, personalized chairs are applicable for office, factory, home, bar, and catering, and the chairs have a fixed shape. At most, the chairs have a height adjustment function, and a soft cushion is provided on the chairs to enhance comfort.

However, muscle sizes of the bones in hip areas of human bodies are different. The seat shapes of the chairs are used for user's hips are fixed, which cannot meet using requirements of different sizes of the user's hips. When seats of the chairs are used in the factory work, because the factory operators need to exert more force, the conformabilities and gripping forces of the unreinforced seats against the hips will affect working efficiency of the operators. Therefore, if desiring to improve the working efficiency, it is necessary to improve the seats' suitability, mating comfort, and gripping force for different human buttocks and target the buttocks.

The present invention has arisen to mitigate and/or obviate the afore-described disadvantages.

SUMMARY OF THE INVENTION

The primary object of the present invention is to provide a chair seat capable of adjusting a width which contains a threaded orifice of a first side of the base rotatably connected with a first wing and a second wing, multiple locking orifices of a second side of the base configured to rotatably connect with an adjustable clamp portion, a first elongated orifice of the first wing, and the second elongated orifice of the second wing, wherein a slot of the adjustable clamp portion has a first beveled conduct face formed behind the guiding orifice and contacting with the first guide member matingly, the slot further has a second beveled conduct face formed ahead of the guiding orifice and contacting with the first guide member matingly, a groove of the base accommodates a screw bolt, and the screw bolt is rotatably connected with a central shaft, the screw bolt is rotatably screwed or unscrewed with the second guide member and the first guide member via the central shaft.

Another object of the present invention is to provide a chair seat capable of adjusting a width which contains an adjustment assembly defined between a clamp sheet of the base and an engagement portion of the adjustable clamp portion.

To obtain above-mentioned aspect, a chair seat capable of adjusting a width provided by the present invention contains a base, an adjustment assembly, a first sitting portion, a second sitting portion, an adjustable clamp portion, a first guide member, a second guide member, a central shaft, and a screw bolt.

The base includes a threaded orifice defined on a first side of the base, multiple locking orifices formed on a second side of the base, a support portion extending upward from an end of the base, and a groove defined on a center of the support portion.

The adjustment assembly includes a first wing and a second wing, the first wing has a first rotatable positioning portion extending from a front side of the first wing, a first locating orifice formed through the first rotatable positioning portion, a first rotatable contact portion extending from a rear side of the first wing, and a first elongated orifice centrally aligned with the first locating orifice.

The second wing has a second rotatable positioning portion contacting with the first rotatable positioning portion, and the second rotatable positioning portion has a second locating orifice aligned with the first locating orifice, the second wing further has a second rotatable contact portion abutting against the first rotatable contact portion, the second rotatable contact portion has a second elongated orifice centrally aligned and contacting with the first elongated orifice, and the threaded orifice is connected with a coupling element so as to rotatably fix the first locating orifice and the second locating orifice.

The first sitting portion is mounted above the first wing and includes a first tilted supporting face formed on the first sitting portion.

The second sitting portion is disposed above the second wing and includes a second tilted supporting face formed on the second sitting portion.

The adjustable clamp portion includes a guiding orifice defined on a center of the adjustable clamp portion, and the adjustable clamp portion includes a slot formed on a top of the adjustable clamp portion. The slot has a first beveled conduct face formed behind the guiding orifice, and the slot has a second beveled conduct face formed ahead of the guiding orifice.

A lower end of the first guide member is inserted into the slot, the first guide member includes a first oblique press face matingly contacting with the first beveled conduct face, and the first guide member further includes a first connection orifice for accommodating the screw bolt.

A lower end of the second guide member is inserted into the slot, and the second guide member includes a second oblique press face matingly contacting with the second beveled conduct face, the second guide member further includes a second connection orifice opposite to the first connection orifice.

A bottom of the central shaft is inserted through the guiding orifice, the first elongated orifice, and the second elongated orifice.

The central shaft includes an abutting face matingly contacting with the base, multiple fixing orifices defined on the abutting face and mating with the multiple locking orifices, multiple screws inserting through the multiple locking orifices and the multiple fixing orifices, and a defining orifice defined on a top of the central shaft.

The screw bolt includes a rotary knob formed on an end thereof, a non-threaded section formed on a middle section of the screw bolt and received in the groove, a first spiral section formed ahead of the non-threaded section and connecting with the first connection orifice, a stepped face formed on an end of the first spiral section and contacting with the central shaft, a limitation section formed ahead of the stepped face and rotatably connected with the defining orifice, a C-shaped retainer fixed ahead of the limitation section and the central shaft and configured to limit the limitation section in the defining orifice by mating with the stepped face, and a second spiral section formed ahead of the limitation section and reversely screwing with the first spiral section and the second connection orifice.

Preferably, the base includes a clamp sheet mounted thereon and having a paw portion protruding upward and abutting the adjustment assembly. The base includes a central orifice defined thereon and configured to receive the central shaft.

Preferably, the adjustable clamp portion includes a pressing face formed on a bottom thereof and an engagement portion contacting with a bottom of the pressing face and abutting against the adjustment assembly, and the adjustable clamp portion includes a receiving orifice defined on the engagement portion and configured to accommodate the central shaft.

DETAILED DESCRIPTION OF THE PREFERRED EMBODIMENTS

Figure 1:
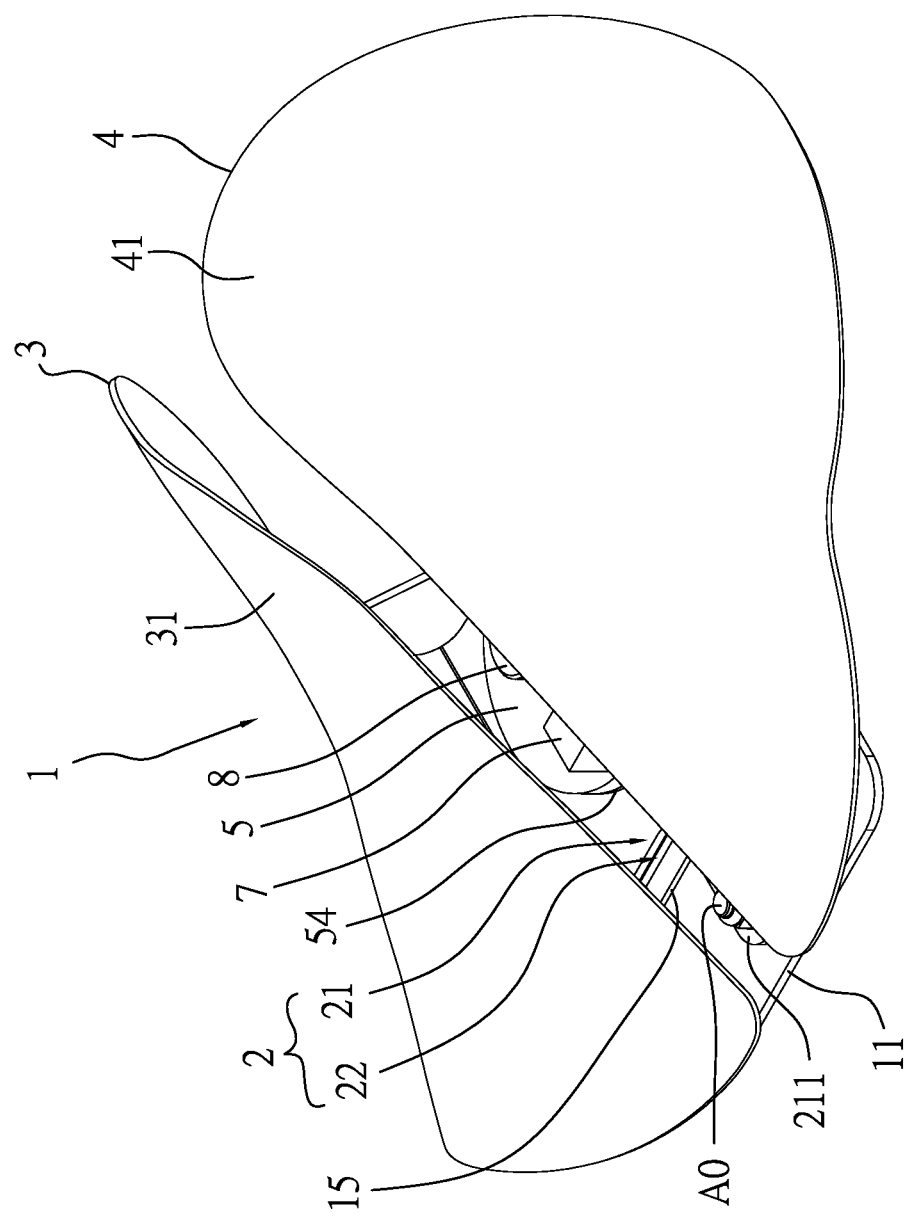
FIG. 1 is a perspective view showing the assembly of a chair seat capable of adjusting a width according to a preferred embodiment of the present invention.

The present invention will be clearer from the following description when viewed together with the accompanying drawings, which show, for purpose of illustrations only, a preferred embodiment in accordance with the present invention.

With reference to FIGS. 1-6, a chair seat 1 capable of adjusting a width according to a preferred embodiment of the present invention comprises a base 11, an adjustment assembly 2, a first sitting portion 3, a second sitting portion 4, an adjustable clamp portion 5, a first guide member 6, a second guide member 7, a central shaft 8, and a screw bolt 9.

The base 11 includes a threaded orifice 12 defined on a first side thereof, multiple locking orifices 13 formed on a second side of the base 11, a support portion 14 extending upward from an end of the base 11, and a groove 141 defined on a center of the support portion 14.

The adjustment assembly 2 includes a first wing 21 and a second wing 22, wherein the first wing 21 has a first rotatable positioning portion 211 extending from a front side thereof, a first locating orifice 212 formed through the first rotatable positioning portion 211, a first rotatable contact portion 213 extending from a rear side of the first wing 21, and a first elongated orifice 214 centrally aligned with the first locating orifice 212. The second wing 22 has a second rotatable positioning portion 221 contacting with the first rotatable positioning portion 211, and the second rotatable positioning portion 221 has a second locating orifice 222 aligned with the first locating orifice 212, wherein the second wing 22 further has a second rotatable contact portion 223 abutting against the first rotatable contact portion 213, the second rotatable contact portion 223 has a second elongated orifice 224 centrally aligned and contacting with the first elongated orifice 214, and the threaded orifice 12 is connected with a coupling element AO so as to rotatably fix the first locating orifice 212 and the second locating orifice 222. The first sitting portion 3 is mounted above the first wing 21 and includes a first tilted supporting face 31 formed on the first sitting portion 3. The second sitting portion 4 is disposed above the second wing 22 and includes a second tilted supporting face 41 formed on the second sitting portion 4. The adjustable clamp portion 5 includes a guiding orifice 51 defined on a center thereof, a slot 52 formed on a top of the adjustable clamp portion 5, wherein the slot 52 has a first beveled conduct face 521 formed behind the guiding orifice 51, and a second beveled conduct face 522 formed ahead of the guiding orifice 51. A lower end of the first guide member 6 is inserted into the slot 52, the first guide member 6 includes a first oblique press face 61 matingly contacting with the first beveled conduct face 521, and the first guide member 6 further includes a first connection orifice 62 for accommodating the screw bolt 9. A lower end of the second guide member 7 is inserted into the slot 52, and the second guide member 7 includes a second oblique press face 71 matingly contacting with the second beveled conduct face 522, and the second guide member 7 further includes a second connection orifice 72 defined thereon and reversely screwed with the first connection orifice 62. A bottom of the central shaft 8 is inserted through the guiding orifice 51, the first elongated orifice 214, and the second elongated orifice 224. The central shaft 8 includes an abutting face 81 matingly contacting with the base 11, multiple fixing orifices 82 defined on the abutting face 81 and mating with the multiple locking orifices 13, multiple screws B inserting through the multiple locking orifices 13 and the multiple fixing orifices 82, and a defining orifice 83 defined on a top of the central shaft 8. The screw bolt 9 has a rotary knob 91 formed on an end thereof, a non-threaded section 92 formed on a middle section of the screw bolt 9 and received in the groove 141, a first spiral section 93 formed ahead of the non-threaded section 92 and connecting with the first connection orifice 62, and a stepped face 931 formed on an end of the first spiral section 93 and contacting with the central shaft 8, a limitation section 94 formed ahead of the stepped face 931 and rotatably connected with the defining orifice 83, a C-shaped retainer C fixed ahead of the limitation section 94 and the central shaft 8 and configured to limit the limitation section 94 in the defining orifice 83 by mating with the stepped face 931, and a second spiral section 95 formed ahead of the limitation section 94 and reversely screwing with the first spiral section 93 and the second connection orifice 72, as illustrated in FIGS. 1-4.

Figure 2:
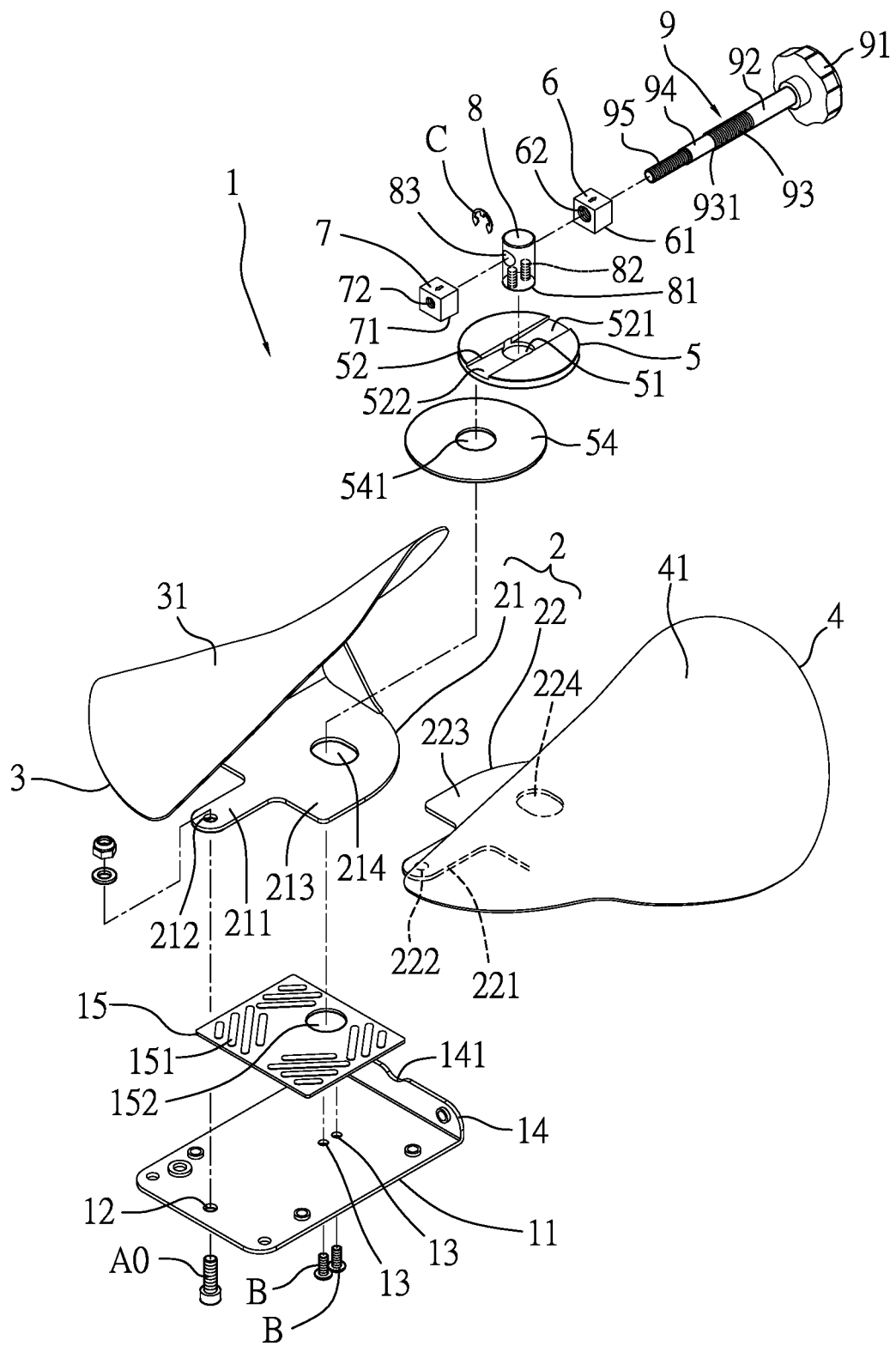
FIG. 2 is a perspective view showing the exploded components of the chair seat capable of adjusting the width according to the preferred embodiment of the present invention.

The base 11 includes a clamp sheet 15 mounted thereon and having a paw portion 151 protruding upward and abutting the adjustment assembly 2, and a central orifice 152 defined thereon and configured to receive the central shaft 8, wherein the adjustable clamp portion 5 includes a pressing face 53 formed on a bottom thereof and an engagement portion 54 contacting with a bottom of the pressing face 53 and abutting against the adjustment assembly 2, and a receiving orifice 55 defined on the engagement portion 54 and configured to accommodate the central shaft 8, as illustrated in FIG. 2.

Figure 3:
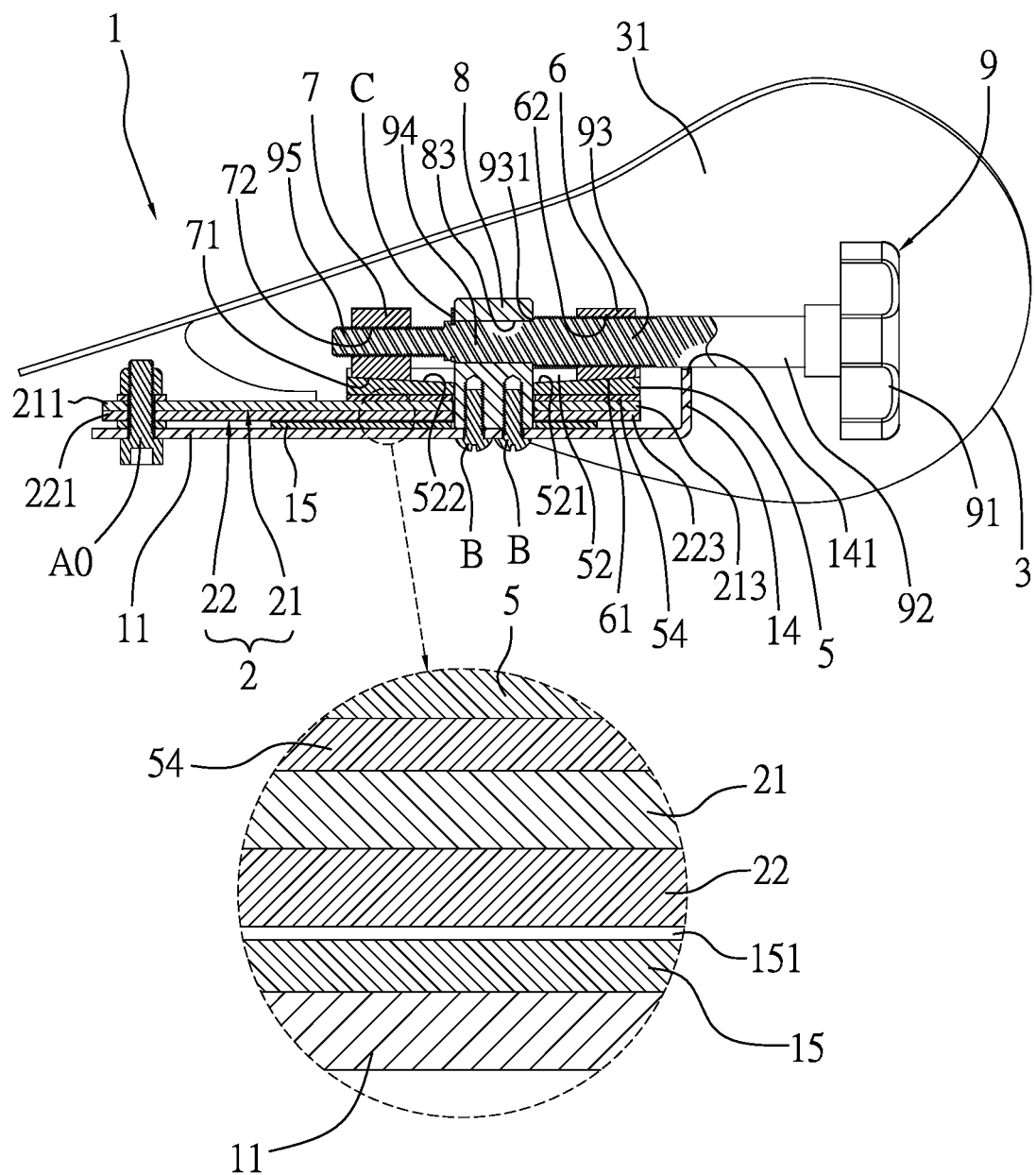
FIG. 3 is a cross sectional view showing the operation of the chair seat capable of adjusting the width according to the preferred embodiment of the present invention.
Figure 4:
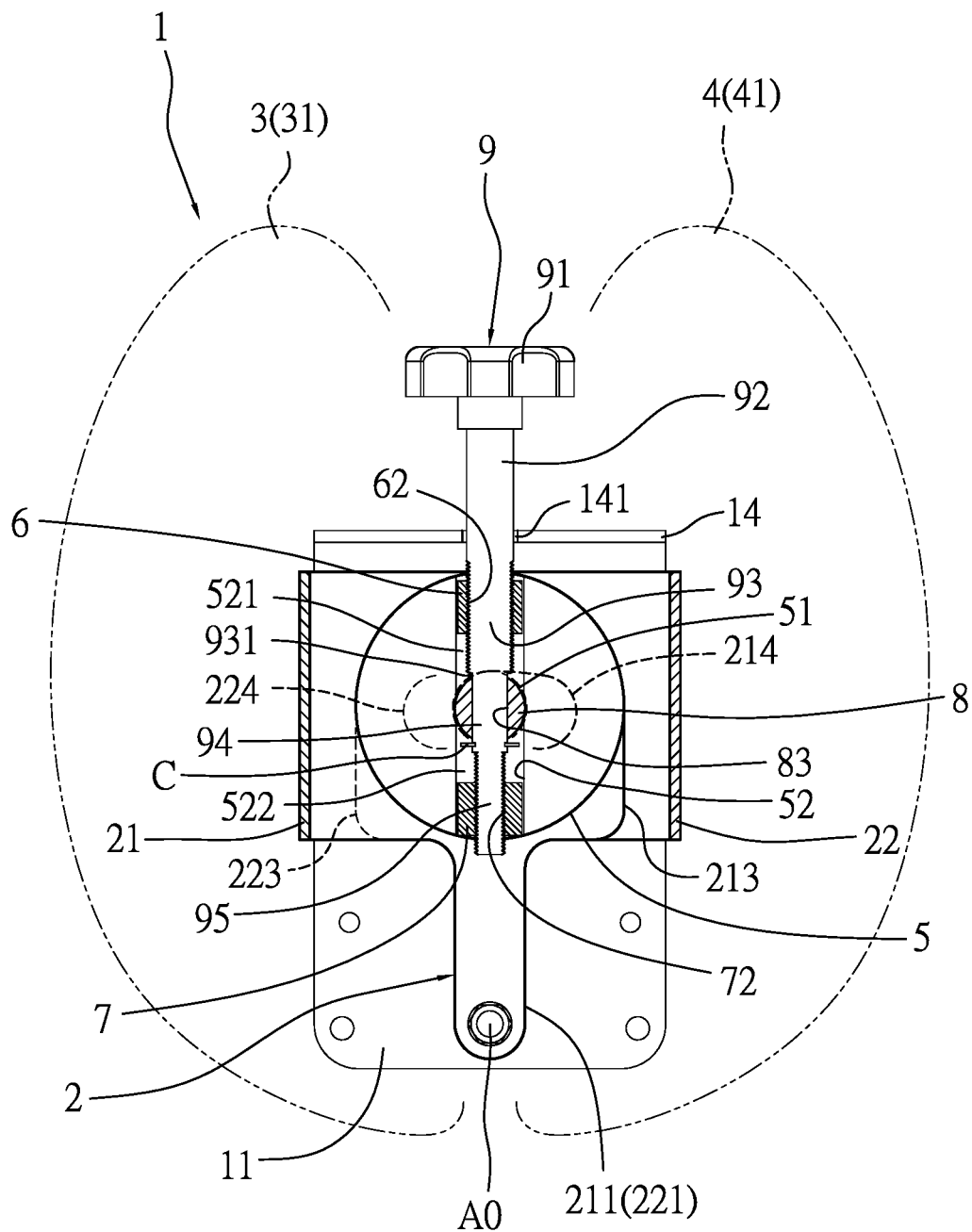
FIG. 4 is a cross sectional view showing the assembly of a part of the chair seat capable of adjusting the width according to the preferred embodiment of the present invention.
Figure 5:
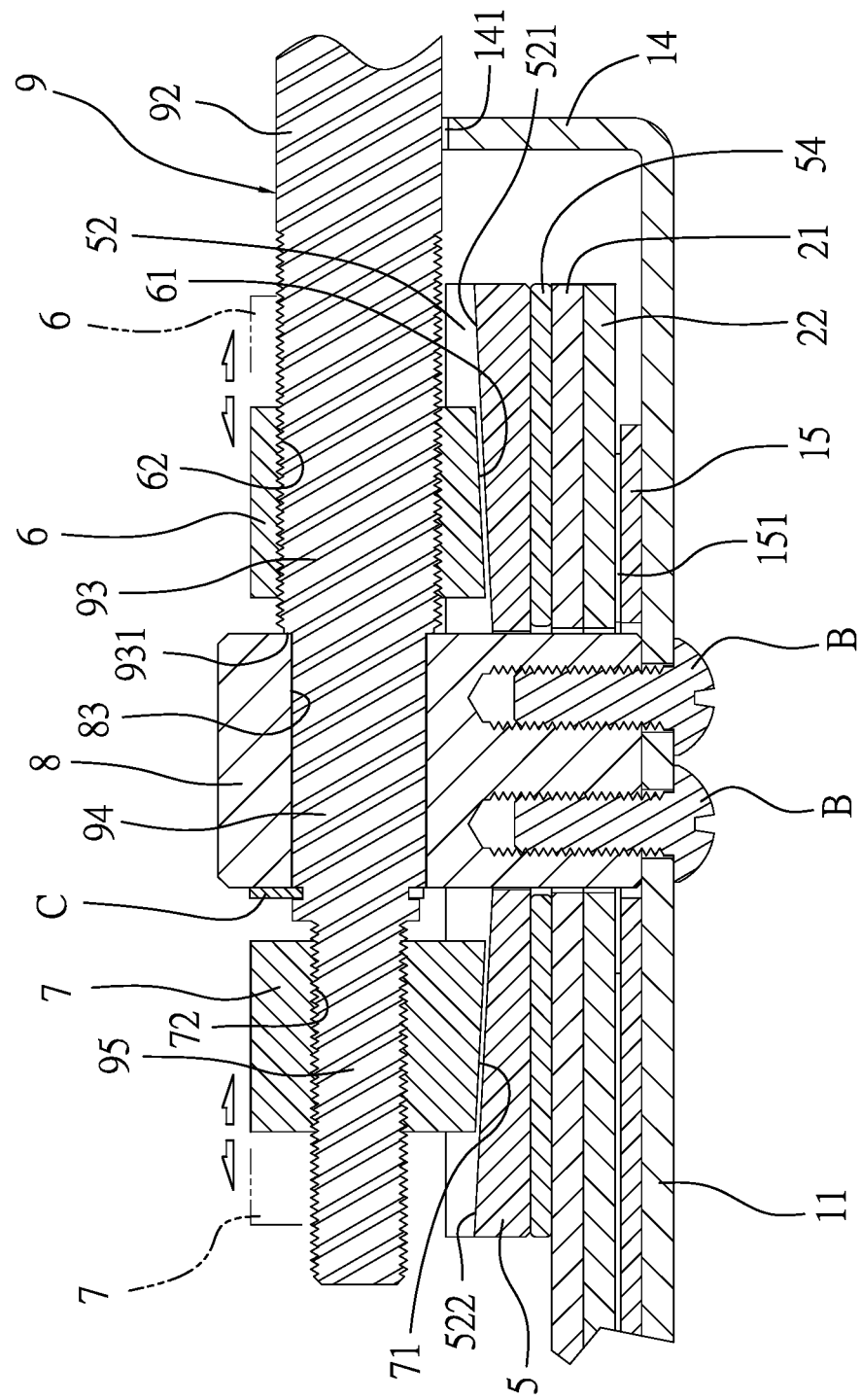
FIG. 5 is another cross sectional view showing the operation of the chair seat capable of adjusting the width according to the preferred embodiment of the present invention.
Figure 6:
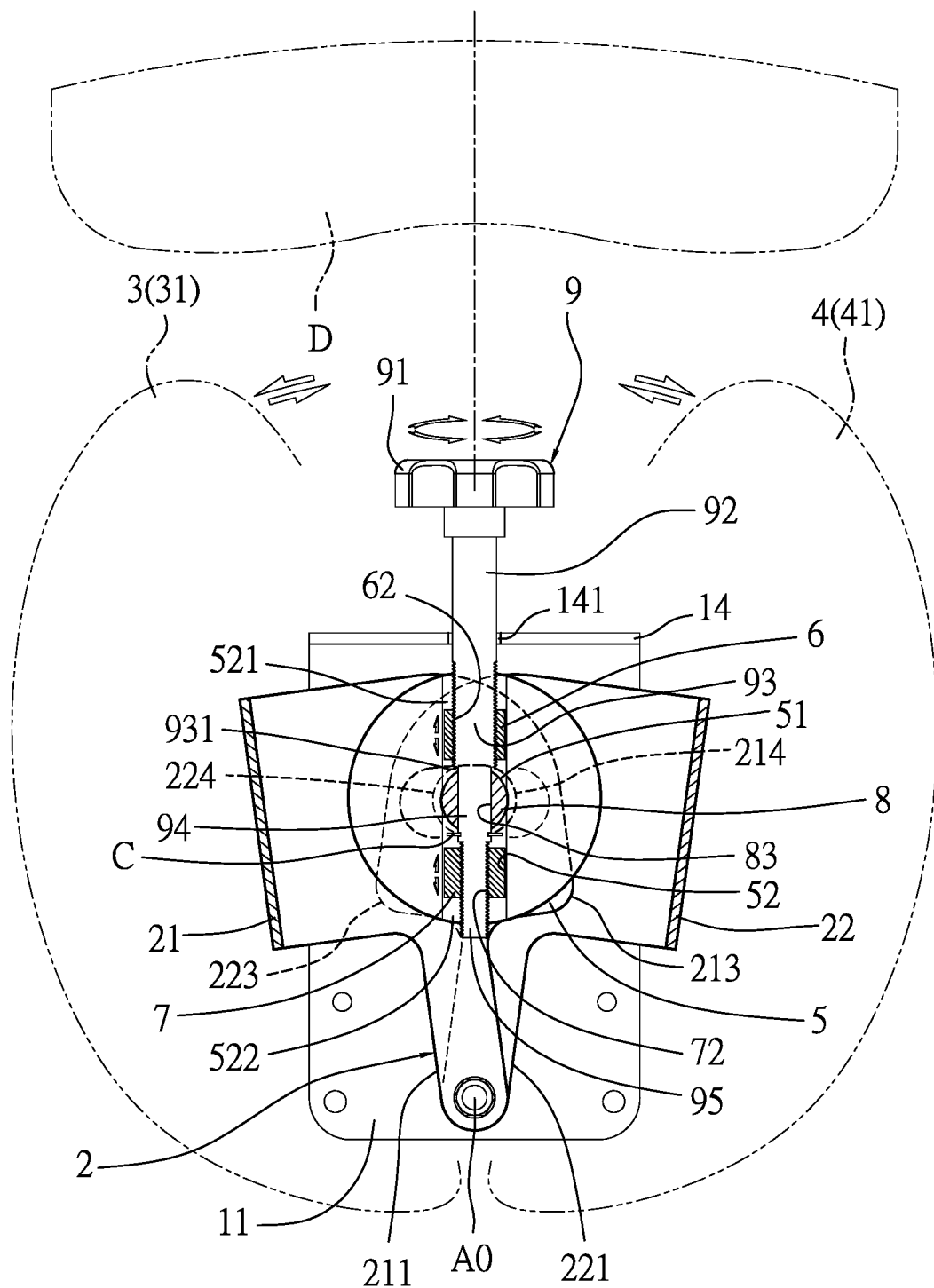
FIG. 6 is a still another cross sectional view showing the operation of the chair seat capable of adjusting the width according to the preferred embodiment of the present invention.

The adjustment assembly 2 is defined between the clamp sheet 15 of the base 11 and the engagement portion 54 of the adjustable clamp portion 5, and the adjustable clamp portion 5 is configured to reversely screw the first guide member 6 and the second guide member 7 with the first spiral section 93 and the second spiral section 95 of the screw bolt 9, wherein the screw bolt 9 is rotated to drive the first oblique press face 61 of the first guide member 6 and the second oblique press face 71 of the second guide member 7 to move outward and press the first beveled conduct face 521 and the second beveled conduct face 522, and the adjustable clamp portion 5 forces the engagement portion 54 to engage with the adjustment assembly 2 without any movement, as shown in FIGS. 3 and 4. In contrast, the screw bolt 9 is rotated to drive the first guide member 6 and the second guide member 7 to move inward and remove from the first beveled conduct face 521 and the second beveled conduct face 522, such that the adjustment assembly 2 drives the first wing 21 and the second wing 22 to move via the first elongated orifice 214 and the second elongated orifice 224 so that the chair seat 1 adjusts a turning on/off position of each of the first wing 21 and the second wing 22 based on different sizes of buttocks, and the first tilted supporting face 31 and the second tilted supporting face 41 enhance a comfort and a support of the chair seat 1 to the buttocks. In the meantime, the screw bolt 9 is perpendicular to a back D of the chair seat 1 to avoid a skewing of the first tilted supporting face 31 and the second tilted supporting face 41 to the back D, as illustrated in FIGS. 5 and 6.

The base 11 fixes the adjustment assembly 2 by mating the clamp sheet 15 with the engagement portion 54, and the adjustable clamp portion 5 is configured to connect the first guide member 6 and the second guide member 7 with the first spiral section 93 and the second spiral section 95 of the screw bolt 9, thereafter the screw bolt 9 is rotated to drive the first guide member 6 and the second guide member 7 to press the adjustable clamp portion 5 so that the adjustable clamp portion 5 engages with the adjustment assembly 2 without any movement.

The screw bolt 9 is rotated to drive the first guide member 6 and the second guide member 7 to move inward and to remove the first beveled conduct face 521 from the second beveled conduct face 522, such that the adjustment assembly 2 drives the first wing 21 and the second wing 22 to move via the first elongated orifice 214 and the second elongated orifice 224 so that the chair seat 1 adjusts the turning on/off position of each of the first wing 21 and the second wing 22 based on different sizes of the buttocks, and the first tilted supporting face 31 and the second tilted supporting face 41 enhance the comfort and the support of the chair seat 1 to the buttocks. In addition, the screw bolt 9 is perpendicular to the back D of the chair seat 1 to avoid the skewing of the first tilted supporting face 31 and the second tilted supporting face 41 to the back D.

It is to be noted that the inventor of the present invention has granted U.S. patent Ser. No. 10/722,036 B2, and more improvements (such as more utility structure for requiring conditions) of the present invention than U.S. patent Ser. No. 10/722,036 B2 have achieved.

While various embodiments in accordance with the present invention have been shown and described, it is clear to those skilled in the art that further embodiments may be made without departing from the scope of the present invention.

What is claimed is:

1. A chair seat capable of adjusting a width comprising:

a base, an adjustment assembly, a first sitting portion, a second sitting portion, an adjustable clamp portion, a first guide member, a second guide member, a central shaft, and a screw bolt;

the base including a threaded orifice defined on a first side of the base, multiple locking orifices formed on a second side of the base, a support portion extending upward from an end of the base, and a groove defined on a center of the support portion;

the adjustment assembly including a first wing and a second wing, the first wing having a first rotatable positioning portion extending from a front side of the first wing, a first locating orifice formed through the first rotatable positioning portion, a first rotatable contact portion extending from a rear side of the first wing, and a first elongated orifice centrally aligned with the first locating orifice;

the second wing having a second rotatable positioning portion contacting with the first rotatable positioning portion, and the second rotatable positioning portion having a second locating orifice aligned with the first locating orifice, the second wing further having a second rotatable contact portion abutting against the first rotatable contact portion, the second rotatable contact portion having a second elongated orifice centrally aligned and contacting with the first elongated orifice, and the threaded orifice being connected with a coupling element so as to rotatably fix the first locating orifice and the second locating orifice;

the first sitting portion mounted above the first wing and including a first tilted supporting face formed on the first sitting portion;

the second sitting portion disposed above the second wing and including a second tilted supporting face formed on the second sitting portion;

the adjustable clamp portion including a guiding orifice defined on a center of the adjustable clamp portion, and a slot formed on a top of the adjustable clamp portion, the slot having a first beveled conduct face formed behind the guiding orifice, and a second beveled conduct face formed ahead of the guiding orifice;

a lower end of the first guide member being inserted into the slot, the first guide member including a first oblique press face matingly contacting with the first beveled conduct face, and the first guide member further including a first connection orifice for accommodating the screw bolt;

a lower end of the second guide member being inserted into the slot, and the second guide member including a second oblique press face matingly contacting with the second beveled conduct face, the second guide member further including a second connection orifice defined thereon and reversely screwed with the first connection orifice;

a bottom of the central shaft being inserted through the guiding orifice, the first elongated orifice, and the second elongated orifice;

the central shaft including an abutting face matingly contacting with the base, multiple fixing orifices defined on the abutting face and mating with the multiple locking orifices, multiple screws inserting through the multiple locking orifices and the multiple fixing orifices, and a defining orifice defined on a top of the central shaft; and the screw bolt including a rotary knob formed on an end thereof, a non-threaded section formed on a middle section of the screw bolt and received in the groove, a first spiral section formed ahead of the non-threaded section and connecting with the first connection orifice, a stepped face formed on an end of the first spiral section and contacting with the central shaft, a limitation section formed ahead of the stepped face and rotatably connected with the defining orifice, a C-shaped retainer fixed ahead of the limitation section and the central shaft and configured to limit the limitation section in the defining orifice by mating with the stepped face, and a second spiral section formed ahead of the limitation section and reversely screwing with the first spiral section and the second connection orifice.

2. The chair seat as claimed in claim 1, wherein the base includes a clamp sheet mounted thereon and having a paw portion protruding upward and abutting the adjustment assembly, and the base includes a central orifice defined thereon and configured to receive the central shaft.

3. The chair seat as claimed in claim 1, wherein the adjustable clamp portion includes a pressing face formed on a bottom thereof and an engagement portion contacting with a bottom of the pressing face and abutting against the adjustment assembly, and the adjustable clamp portion includes a receiving orifice defined on the engagement portion and configured to accommodate the central shaft.

\* \* \* \* \*